(12) United States Patent
Abrol

(10) Patent No.: US 6,654,360 B1
(45) Date of Patent: Nov. 25, 2003

(54) METHOD AND SYSTEM FOR PROVIDING DORMANT MODE WIRELESS PACKET DATA SERVICES

(75) Inventor: Nischal Abrol, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/480,465

(22) Filed: Jan. 10, 2000

(51) Int. Cl.[7] .............................................. H04Q 7/00
(52) U.S. Cl. ...................................... 370/329; 455/556
(58) Field of Search ................................ 370/328, 338, 370/401, 402, 403, 557, 465, 466, 252, 329; 455/552, 426, 466, 509, 555, 556, 557, 558, 559; 709/104, 219, 224; 713/100

(56) References Cited

U.S. PATENT DOCUMENTS

| | | | | |
|---|---|---|---|---|
| 5,159,592 A | * | 10/1992 | Perkins ........................ | 370/338 |
| 5,519,706 A | * | 5/1996 | Bantz et al. ................. | 455/435 |
| 5,537,404 A | * | 7/1996 | Bentley et al. .............. | 370/384 |
| 5,873,031 A | * | 2/1999 | Griffith et al. ............... | 455/412 |
| 6,081,536 A | * | 6/2000 | Gorsuch et al. ............. | 370/468 |
| 6,128,490 A | * | 10/2000 | Shaheen et al. ............. | 455/434 |
| 6,208,859 B1 | * | 3/2001 | Halvorson .................... | 455/430 |
| 6,249,681 B1 | * | 6/2001 | Virtanen ....................... | 455/466 |
| 6,272,129 B1 | * | 8/2001 | Dynarski et al. ............. | 370/356 |
| 6,519,266 B1 | * | 2/2003 | Manning et al. ............. | 370/469 |

FOREIGN PATENT DOCUMENTS

| | | |
|---|---|---|
| EP | 0872982 | 10/1998 |
| EP | 0930792 | 7/1999 |

OTHER PUBLICATIONS

Tanenbaum, AS "Computer Networks" Sections 6.4, 7.4 and 7.6 (pp. 529–533; 658; 685) Prentice Hall International, Inc. (1996).

* cited by examiner

Primary Examiner—Melvin Marcelo
Assistant Examiner—Jasper Kwoh
(74) Attorney, Agent, or Firm—Philip Wadsworth; Kent Baker; Byron Yafuso

(57) ABSTRACT

An improved method and system for terminating dormant mode wireless packet data sessions when a remote network node becomes inaccessible. A wireless subscriber station sends the wireless network a termination notification identifying a packet data session corresponding to a remote network node that has become inaccessible and should be terminated.

44 Claims, 4 Drawing Sheets

METHOD AND SYSTEM FOR PROVIDING DORMANT MODE WIRELESS PACKET DATA SERVICES

BACKGROUND OF THE INVENTION

I. Field of the Invention

The current invention relates to wireless communications. More particularly, the present invention relates to an improved method and system for providing dormant mode wireless packet data services.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95. In addition, a new standard for Code division multiple access communications systems has been proposed in the United States in Telecommunications Industry Association PN-4431 and published as TIA/EIA/IS-2000-5, entitled "UPPER LAYER (LAYER 3) SIGNALING STANDARD FOR IS-2000 SPREAD SPECTRUM SYSTEMS", dated Jul. 11, 1999, incorporated by reference herein, and hereinafter referred to as IS-2000.

The International Telecommunications Union recently requested the submission of proposed methods for providing high rate data and high-quality speech services over wireless communication channels. A first of these proposals was issued by the Telecommunications Industry Association, entitled "The IS-2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as W-CDMA. A third proposal was submitted by U.S. TG 8/1 entitled "The UWC-136 Candidate Submission", hereinafter referred to as EDGE. The contents of these submissions is public record and is well known in the art.

IS-95 was originally optimized for transmission of variable-rate voice frames. Subsequent standards have built on the standard to support a variety of additional non-voice services including packet data services. One such set of packet data services was standardized in the United States in Telecommunications Industry Association TIA/EIA/IS-707-A, entitled "Data Service Options for Spread Spectrum Systems", incorporated by reference herein, and hereafter referred to as IS-707.

IS-707 describes techniques used to provide support for sending Internet Protocol (IP) packets through an IS-95 wireless network. A remote network node such as a laptop computer connected to a packet-data-capable cellular phone accesses the Internet through a wireless network in accordance with the IS-707 standard. The laptop computer typically negotiates a dynamic IP address with an interworking function (IWF) in the wireless network, also sometimes called a Packet Data Serving Node (PDSN). Negotiation of a dynamic IP address typically is performed in accordance with the well known Point-to-Point Protocol (PPP). For the duration of the packet data session between the IWF and the remote network node, the PPP state of the remote network node is stored in the IWF.

This IP address is assigned from a pool of addresses controlled by the wireless network. The laptop computer then uses this negotiated IP address to access Internet resources such as e-mail servers and web sites. Packets sent back to the laptop computer by the Internet are addressed to the assigned dynamic IP address and therefore routed to the PDSN or the wireless network.

As the IS-95 standard was optimized for voice service, it has some "circuit-switched" characteristics that are not ideal for the generally bursty nature of IP data traffic. IS-707 provides a method of establishing a "packet data call" through which a subscriber station may route packets of data (usually IP datagrams) through an IS-95 wireless network to the Internet. Once established, a packet data call remains active whether or not it is being used to transport packets. For example, a packet data call established in a packet data session to download a web page may remain active long after the download transfer is complete. Such an active packet data call consumes valuable wireless channel resources that would otherwise be available for other calls. To prevent excessive waste of wireless channel resources in idle packet data calls, many existing packet data service implementations tear down packet data calls after a period of inactivity (lack of packet traffic). Some implementations use an "inactivity timer," the expiration of which causes the wireless system to drop the packet data call.

Some wireless networks destroy the network state of a remote network node as soon as a packet data call is dropped. When this happens, the dynamic IP address previously assigned to the dropped call is eventually freed up for use by other remote network nodes. This is generally allowable because most mobile networking applications such as retrieving e-mail and web page access are transaction-based. In other words, the laptop computer makes a request for information, and then receives the requested information from the network. The network does not generally initiate an information exchange with the remote network node. If the remote network node (laptop computer) initiates another access after its packet data call has dropped, it renegotiates its dynamic IP address with the wireless network's PDSN. The IP address negotiation process takes extra bandwidth and causes delays in the wireless channel that appear as network "sluggishness" to the laptop computer user.

In order to avoid unnecessarily renegotiating dynamic IP addresses, and to allow more efficient use of wireless channel resources, wireless network implementations support "dormant mode" operation. After the expiration of the inactivity timer, the wireless system brings down the packet data call, but preserves the network state of the remote network node. The connection that exists between the laptop computer and the wireless system in the absence of an active packet data call is referred to as dormant. The next time the remote network node wishes to access the packet data network, it causes another packet data call to be established, but does not need to renegotiate its dynamic IP address and PPP state. Reusing the previously negotiated IP address and PPP state saves bandwidth that would otherwise be consumed by packet data session renegotiations, thereby reducing the perceived sluggishness of the network access.

Because of the inherent complexities associated with dormant mode packet data implementations, wireless carriers have been slow to adopt dormant mode implementations of packet data services. For this reason, the development and debugging of dormant mode protocols has not advanced as quickly as possible. As wireless packet data services become more popular, and as its customers become more sophisticated, the remaining traps and pitfalls associated with designing protocols for providing dormant mode packet data services will have to be navigated.

SUMMARY OF THE INVENTION

Embodiments of the present invention may be used to resolve such conflicts as can occur when a remote network node that communicates with a packet data network through a wireless network is physically disconnected from the wireless network. A remote network node can be a laptop computer connected to a wireless subscriber station or can be a network services client such as a web microbrowser within the subscriber station. Web microbrowsers such as those that use the Wireless Applications Protocol (WAP) are well known in the art. A disconnection can take the form of terminating a microbrowser application or disconnecting a remote network node such as a laptop computer from its serving wireless subscriber station. The present invention is applicable to any communication system used to wirelessly transport packet data between a remote network node and a packet data network such as the Internet. The present invention is applicable to systems such as IS-2000, W-CDMA, and EDGE, wherein a packet may be carried within over-the-air frames specified for use by the wireless communication system.

As previously described, a wireless network that supports dormant mode maintains a virtual network connection between a remote network node and a packet data network even after any call between the serving wireless subscriber station and the wireless network ends. A virtual connection through a wireless subscriber station that has no active call with a wireless network is called a dormant connection. If a remote network node becomes inaccessible to packet data while its connection through the wireless network is dormant, there is no way to notify the packet data network or the wireless network of the inaccessibility. Such inaccessibility causes no problems as long as accessibility is restored before any packets need to be exchanged with the remote network node. For example, briefly disconnecting a laptop computer from its serving wireless subscriber station does not cause problems so long as the laptop computer and the packet data network make no attempts to send packets to each other while the laptop computer is disconnected.

However, if packets addressed to a still-inaccessible remote network node are generated by the packet data network, they will be unable to reach their final destination in the laptop computer. Because the packets do not reach their intended application, no packets can be sent by the laptop computer or any other network entity acknowledging their receipt. In many common network protocols, unacknowledged packets are then retransmitted by the packet data network.

A packet addressed to a remote network node is generally routed to the wireless network associated with the remote network node's associated wireless subscriber station. If the connection between the wireless subscriber station and the wireless network is dormant, the wireless network initiates a packet data call to the wireless subscriber station to deliver the new packet. In some existing wireless data implementations, an incoming packet data call includes a directive from the wireless network that causes the wireless subscriber station to ring. If the remote network node is inaccessible, the subscriber station will not "answer" the incoming packet data call, and may ring until the expiration of a timeout of usually around 65 seconds. Repeated attempts by the packet data network to retransmit unacknowledged packets will also cause the subscriber station to ring. This undesirable ringing can continue until the connection between the subscriber station and the laptop computer is restored, the subscriber station ringer is turned off, or the subscriber station is powered down.

Turning off the ringer or powering down a subscriber station to avoid packet data delivery attempts is undesirable in many cases, because the same subscriber station may be used to provide multiple types of services. For example, a single subscriber station may provide voice or microbrowser services in addition to packet data services. Powering down the subscriber station would make all of these services unavailable to the user. Turning off the ringer makes it difficult or impossible for the subscriber station to notify the user of an incoming voice call. It is therefore highly desirable for a wireless network to be able to terminate network connections to inaccessible remote network nodes.

Embodiments of the present invention address the above described problem by allowing the subscriber station to initiate a process that terminates the network connection between a remote network node and the wireless network. Subsequent packets sent by the packet data network to the wireless network and addressed to the inaccessible remote network node do not cause the wireless network to originate packet data calls. Embodiments of the present invention therefore prevent unnecessary packet data call originations and undesirable subscriber station behavior.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
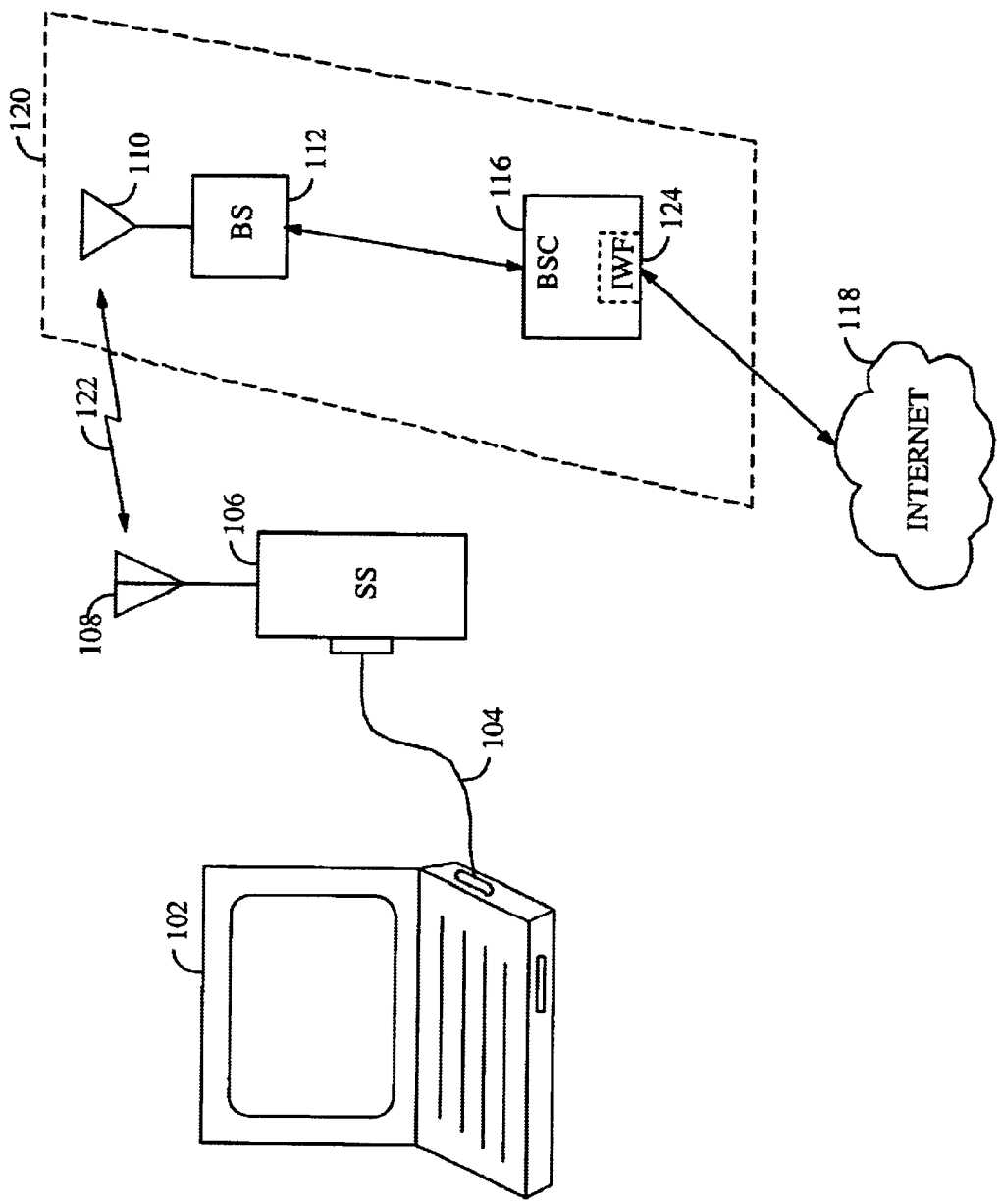
FIG. 1 is a diagram of a data communications system configured in accordance with an embodiment of the invention.

FIG. 1 is a diagram of a data communications system configured in accordance with an embodiment of the invention. In the exemplary embodiment, laptop computer 102 is connected to subscriber station (SS) 106 through cable 104. Subscriber station 106 establishes a wireless connection to base station (BS) 112 through antennas 108 and 110 and wireless communication channel 122. Through the wireless connection established between SS 106 and BS 112, laptop computer 102 sends packet data through connected base station controller (BSC) 116 to packet data network 118. In the embodiment shown, wireless network 120 includes BSC 116 and multiple base stations like BS 112. BSC 116 also includes interworking function (IWF) 124. One skilled in the art will recognize that BSC 116 may also include a mobile switching center (MSC).

Laptop computer 102 establishes a network connection to packet data network 118 through SS 106 and wireless network 120. In the exemplary embodiment, this network connection is established by bringing up a packet data call through wireless communication channel 122 and negotiating a Point-to-Point Protocol (PPP) session with BSC 116. During the PPP negotiations, laptop computer 102 is assigned an Internet Protocol (IP) address from a pool belonging to BSC 116. Laptop computer 102 then exchanges IP packets with packet data network 118. Packet data network 118 could be the Internet, a corporate intranet, or any of a variety of other types of packet data network.

Laptop computer 102 then exchanges packets with packet data network 118, for example downloading a web page. In many applications such as web browsing, the packet data traffic occurs in bursts. For example, the maximum amount of data is transferred through wireless communication channel 122 as a web page is downloaded, followed by a lack of packet data traffic as the laptop computer user reads the contents of the downloaded page. During such low-packet-traffic periods, wireless communication channel 122 remains idle and underutilized. In wireless systems that support dormant mode, wireless communication channel 122 is torn down during idle periods and made available for use by other wireless network users. As soon as packet data traffic resumes between laptop computer 102 and packet data network 118, wireless network 120 restores wireless communication channel 122.

Wireless network 120 has no way of knowing when laptop computer 102 is disconnected or powered down while the connection between SS 106 and wireless network 120 is dormant. In existing wireless networks that support packet data, the higher protocol layers are shared only between the remote network node (i.e. laptop computer 102) and BSC 116. In such systems, SS 106 has no way to alter the PPP state that exists between laptop computer 102 and BSC 116. Allowing SS 106 to alter the PPP state within BSC 116 is a "layering violation" that can cause synchronization problems between laptop computer 102 and BSC 116. Embodiments of the present invention allow this "layering violation" when a remote network node such as laptop computer 102 becomes inaccessible to packet data traffic. Any packets received by SS 106 and addressed to the inaccessible laptop computer 102 are undeliverable.

In an exemplary embodiment, SS 106 responds to an incoming, but undeliverable packet by sending a notification to BSC 116 to terminate the associated PPP state. In the various described embodiments, this packet data session termination notification can be sent in any of a variety of messages once SS 106 is notified that the incoming call is a data services call. In an exemplary embodiment, the receipt of an undeliverable packet does not cause the phone to ring.

In another embodiment, multiple simultaneous packet data sessions are supported by SS 106, and only the session corresponding to the inaccessible network node is terminated. In this embodiment, the packet data session termination notification sent by SS 106 to BSC 116 identifies the specific session or sessions to be terminated. Remaining sessions, for example a microbrowser session running within SS 106, are left unchanged. In an alternate embodiment, no matter how many packet data sessions have become inaccessible, SS 106 terminates all its packet data sessions with BSC 116.

Although laptop computer 102 is shown as external to SS 106 and connected by cable 104, one skilled in the art will recognize that a remote network node could be connected to SS 106 in other ways without departing from the present invention. For example, laptop computer 102 could communicate with SS 106 through an infrared data association (IRDA) interface or local wireless interface. One example of such a local wireless interface is the bluetooth interface, which is well known in the art.

One skilled in the art will also recognize that a remote network node could be incorporated into SS 106 without departing from the present invention. For example, SS 106 could have a microbrowser built into the subscriber station handset. After downloading a web page to the microbrowser, the connection between SS 106 and BSC 116 would eventually become dormant. If the subscriber station user then terminates the microbrowser application, it is not necessary to establish a wireless connection just to inform BSC 116 of the change. If a subsequent packet is sent by packet data network 118 to the now-inaccessible microbrowser, BSC 116 originates a packet data call to SS 106, and SS 106 sends a packet data session termination notification to BSC 116. Any other packets sent by packet data network 118 to the now-inaccessible microbrowser may now be discarded by BSC 116 without wasting valuable over-the-air resources or causing undesirable behavior in SS 106.

SS 106 and wireless network 120 may communicate over any of several types and frequency bands of wireless communication channel 122. For example, wireless communication channel 122 may be in the cellular or PCS frequency bands. Also, wireless communication channel 122 may be a CDMA or TDMA channel. Specifically, wireless communication channel 122 may be an IS-2000, IS-95, GSM, W-CDMA, or EDGE channel.

Figure 2:
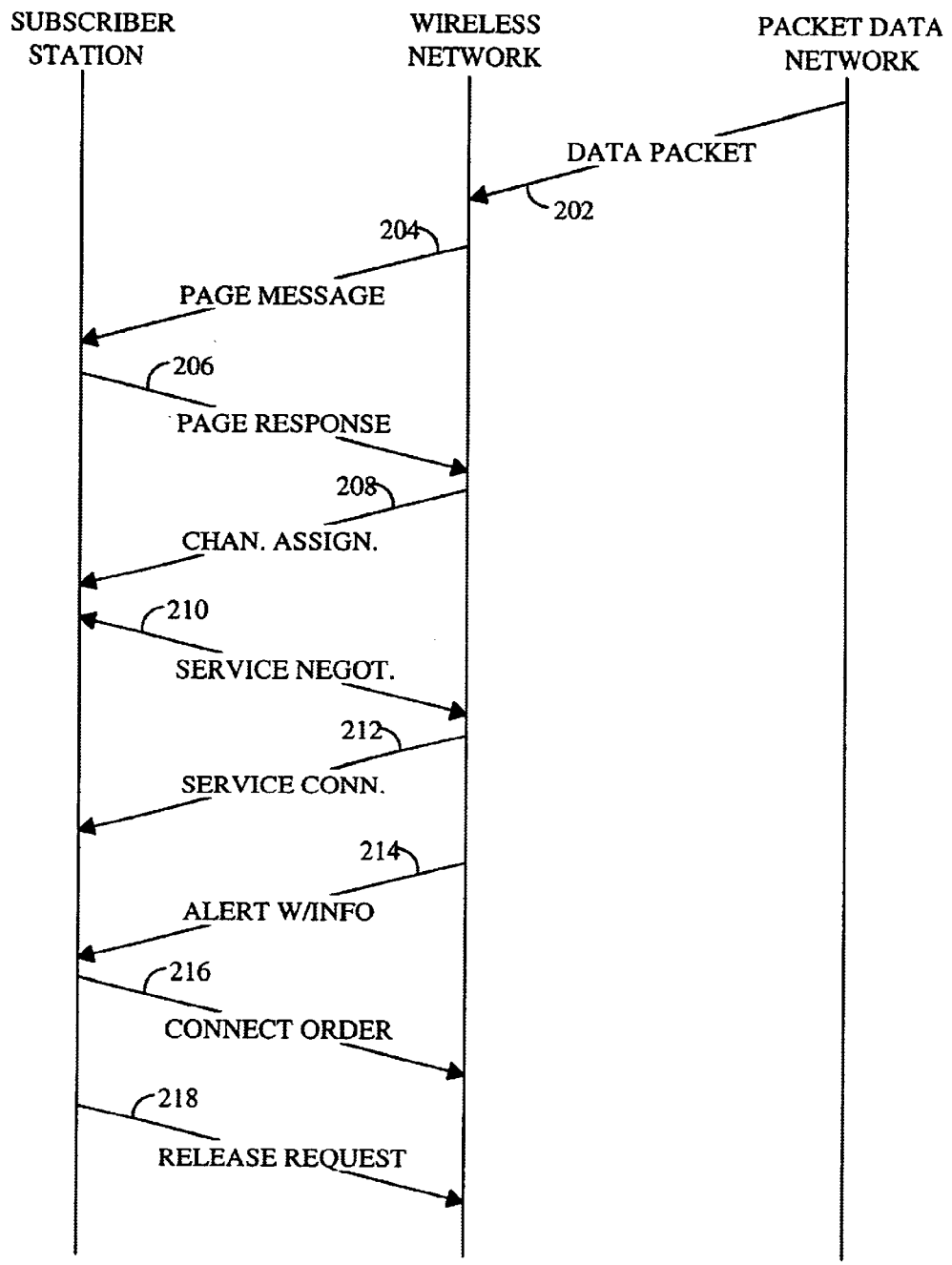
FIG. 2 is a diagram showing the flow of messages in which a subscriber station terminates a network connection with a base station in accordance with an embodiment of the invention.

FIG. 2 is a diagram showing the flow of messages in which a subscriber station terminates a network connection with a base station in accordance with an embodiment of the invention. In the exemplary embodiment, packet data network 118 sends a data packet to wireless network 120 addressed to a remote network node associated with a dormant connection between SS 106 and wireless network 120. In the exemplary embodiment, the remote network node is inaccessible, making the data packet undeliverable. As discussed above, SS 106 responds by sending a packet data session termination notification to wireless network 120, so that subsequent data packets to the remote network node can be rejected by wireless network 120 without bringing up new calls. Though the message flow is described in terms of IS-95 and IS-2000 messaging, the methods associated with the present invention are applicable to other aforementioned wireless standards.

The message flow shown starts when packet data network 118 sends a data packet 202 to wireless network 120. In the exemplary embodiment, the connection between SS 106 and wireless network 120 is dormant (no active call exists). Wireless network 120 starts to bring up a packet data call by sending page message 204 to SS 106. Upon receiving page message 204, SS 106 responds by sending page response message 206 to wireless network 120. Wireless network 120 then sends channel assignment message 208 indicating a traffic channel to be used by SS 106 and wireless network 120.

Once on the traffic channel, SS 106 and wireless network 120 perform service negotiation 210. As is well known in the art, service negotiation may comprise several messages sent between SS 106 and wireless network 120. Service negotiation 210 is generally the first opportunity for SS 106 to identify the type of the incoming call as a packet data call. Service negotiation 210 also identifies the particular packet data session or sessions for which the packet data call was initiated.

In the exemplary embodiment, wireless network 120 proceeds to send SS 106 a service connect message 212 and an alert with information message 214. Wireless network 120 may send these two messages in either order or may omit one or both of them without departing from the present invention. The alert with information message 214 is typically the message that prompts the subscriber station to activate its ringer.

At this point in call setup, SS 106 evaluates the accessibility status of the remote network node associated with the packet data session or sessions identified during service negotiation 210. In existing implementations, the alert with information message 214 would cause SS 106 to begin ringing. The ringing might continue until accessibility to the destination remote network node is restored or until the ringing at SS 106 is disabled by a user. If accessibility to the destination remote network node is restored, perhaps by reconnecting cable 104 to laptop computer 102, then SS 106 sends connect order message 216 (essentially answering the ringing phone) and accepts the incoming packet data.

In the exemplary embodiment, SS 106 sends connect order message 216 whether or not the destination remote network node associated with the indicated packet data session is accessible. If the remote network node is accessible, sending connect order message 216 allows SS 106 to proceed to receiving its packet data. If the destination remote network node is inaccessible, then sending connect order message 216 puts the call between SS 106 and wireless network 120 into a state that allows SS 106 to send release request message 218. Request message 218 then includes a termination notification for the packet data session associated with the inaccessible remote network node.

It is undesirable to send such a packet data session termination notification in connect order message 216 for at least two reasons. First, connect order message 216 leaves the packet data call in an active state. Some kind of call release message would still need to be sent. Second, existing connect order message formats have been standardized, so adding information that would identify a packet data session or sessions to be terminated would mean changing the standard. Changing entrenched standards like IS-95, or even departing from IS-95 conventions in an emerging standard like IS-2000 is generally very difficult without very compelling justifications.

In one embodiment, however, a termination notification for packet data sessions is incorporated into an existing IS-95 or IS-2000 Release Order without changing the format of the packets. This is made possible by using the Order Qualification Code (ORDQ) field that already exists in the IS-95 and IS-2000 Release Order. Only one bit of the existing 8-bit ORDQ in the current Release Order message format is used to convey information. Some or all of the remaining 7 bits could be used to carry termination notification for packet data sessions. In a first embodiment, one bit is used to indicate that all packet data sessions associated with SS 106 should be terminated in wireless network 120. In a second embodiment, several bits are used to identify a specific packet data session to be terminated. In a third embodiment, several of the bits are used as a bit field to identify one or more packet data sessions to be terminated. An exemplary format for bit usage in the ORDQ field for the second or third embodiments is proposed in Table 1 below. In Table 1, the fields shown as nnnn may identify any one of sixteen possible packet data sessions (in the second described embodiment) or any combination of four possible packet data sessions (in the third described embodiment) to be terminated.

TABLE 1

Order and Order Qualification Codes for Termination Notification

| Order, Code, ORDER (binary) | Order Qualification Code, ORDQ (binary) | More Fields other than ORDQ | Name/Function |
| --- | --- | --- | --- |
| 010101 | nnnn0000 | N | Release Order with termination notification (where 'nnnn' identifies the session or sessions to be terminated) |
| 010101 | 00000000 | N | Release Order (normal release) |
| 010101 | 00000001 | N | Release Order (with power-down indication) |

In another embodiment, release request message 218 is replaced by a new Resource Release Request Message that includes order-specific fields that are used specifically to identify packet data sessions to be terminated. An exemplary format for such a Resource Release Request Message is shown in Table 2 below. In Table 2, SS 106 sets the SR_ID field to the service reference identifier corresponding to the packet data session to be terminated. Service reference identifiers are described in the aforementioned IS-2000 specification. SS 106 sets the PURGE_SERVICE field to '1' to allow the terminated SR_ID to be reused by another packet data session. Otherwise, SS 106 sets the PURGE_SERVICE field to '0'. In an alternate embodiment, the SR_ID and PURGE_SERVICE fields are bit map fields allowing simultaneous release of a combination of packet data sessions.

TABLE 2

Exemplary Format for Resource Release Request Message

| Order-Specific Field | Length (bits) |
| --- | --- |
| SR_ID | 0 or 3 |
| PURGE_SERVICE | 0 or 1 |

Figure 3:
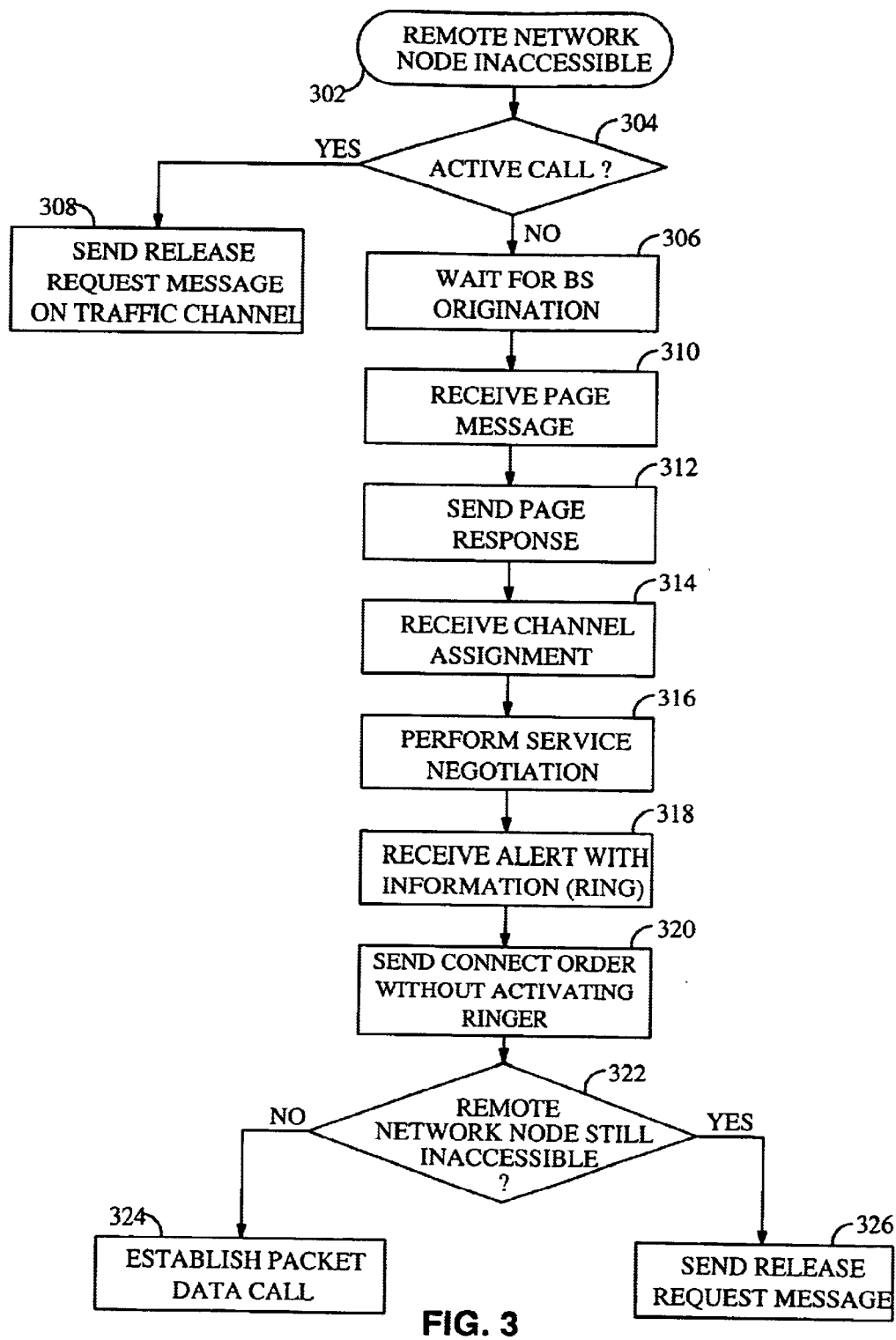
FIG. 3 is a flowchart of the steps taken by a subscriber station to notify a wireless network that a packet data session associated with an unavailable remote network node should be terminated.

FIG. 3 is a flowchart of the steps taken by subscriber station 106 to notify wireless network 120 that a packet data session associated with an unavailable remote network node should be terminated. At step 302, the remote network node associated with a packet data session becomes inaccessible. As previously described, this could be due to such conditions as laptop computer 102 being disconnected from SS 106 or being powered down. If the remote network node remains inaccessible after a traffic channel is established, then SS 106 sends a packet data session termination notification at either step 308 or step 326.

When SS 106 firsts detects that the remote network node has become inaccessible, SS 106 determines whether it already has an active traffic channel set up with wireless network 120. This determination takes place at step 304. If an active traffic channel already exists between SS 106 and wireless network 120, then SS 106 sends release request message 218 at step 308. As previously discussed, SS 106 may send a Resource Release Request message in lieu of release request message 218. Sending a Resource Release Request message may be more appropriate if multiple service options are being supported by the traffic channel, and not all of the service options should be terminated. For example, in a simultaneous-voice-and-data call, it would be undesirable to have to release the voice call just to terminate the packet data session associated with the unavailable remote network node. The Resource Release Request message could be used to selectively terminate only the packet data session without affecting voice service.

If no active traffic channel exists, then SS 106 waits (step 306) until a packet data call comes in from base station 112 in wireless network 120. A call that is initiated by wireless network 120 through a base station 112 to a subscriber station is referred to as a land-to-mobile call. SS 106 then receives and decodes the page message at step 310, sends a page response message at step 312, and receives a channel assignment message at step 314. SS 106 then performs service negotiation with wireless network 120 at step 316.

As discussed above, service negotiation identifies the incoming call as a packet call to SS 106. SS 106 processes the alert with information message at step 318 if one is sent by wireless network 120. In the exemplary embodiment, SS 106 ignores any directive in the alert with information message to activate a ringer in the subscriber station. Instead, SS 106 sends a connect order at step 320. In an alternate embodiment, subscriber station (SS 106) will ring briefly before sending the connect order at step 320. In the exemplary embodiment, the accessibility of the remote network node is again evaluated at step 322. In the event that the remote network node associated with the packet data session has become again accessible, then SS 106 resumes ordinary packet data traffic at step 324. If the remote network node associated with the packet data session is still inaccessible, then SS 106 (at step 326) sends either a release request message or a Resource Release Request message as described above.

In an alternate embodiment, SS 106 omits step 322 and proceeds from step 320 directly to step 326.

Figure 4:
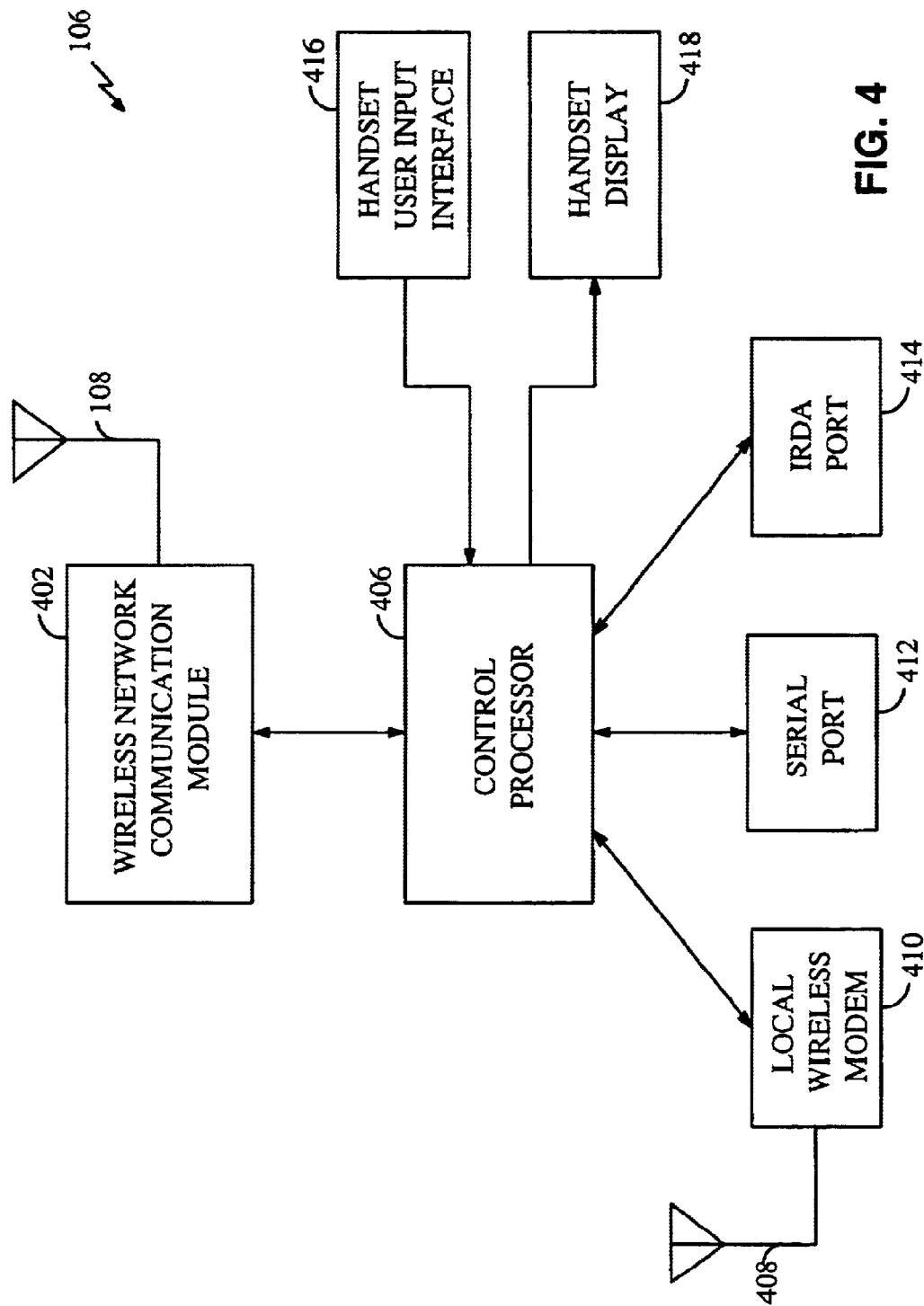
FIG. 4 is a block diagram of a subscriber station apparatus configured in accordance with an embodiment of the present invention.

FIG. 4 is a block diagram of subscriber station apparatus 106 in accordance with an embodiment of the present invention. The diagram shows several different types of physical interface that SS 106 may use to communicate with an external remote network node. In addition, the diagram includes handset user input interface 416 and handset display 418 that allow access to a remote network node that is incorporated into SS 106 such as a microbrowser.

As shown, control processor 406 is connected to local wireless modem 410, serial port 412, and IRDA port 414. SS 106 may use each of these physical interfaces to communicate with a different external device acting as a remote network node. Such an external device could be a laptop computer or other portable packet data device that provides access to the Internet, world-wide web, e-mail or schedule applications over a packet data network. One skilled in the art will recognize that any combination of these physical interface types and a variety of other interface types may be implemented in a subscriber station without departing from the present invention. If configured as shown in FIG. 1, laptop computer 102 would connect through cable 104 to serial port 412. A remote network node equipped with a local wireless modem would communicate with SS 106 through local wireless modem 410 and antenna 408. An example of a local wireless modem is one using the aforementioned bluetooth local wireless interface. IRDA port 414 uses infrared techniques that are well known in the art, but could also be any other light-based wireless communication interface. Serial port 412 could be RS-232, Universal Serial Bus (USB), or any other communication interface requiring a physical cable between remote network node 102 and subscriber station 106.

Control processor 406 is also connected to wireless network communication module 402, which enables communication of data packets between SS 106 and wireless network 120. Wireless network communication module 402 may utilize any of a variety of wireless technologies without departing from the present invention. In the exemplary embodiment, wireless network communication module 402 uses CDMA techniques to generate an IS-95 waveform for communicating with a CDMA cellular or PCS network. In the exemplary embodiment, control processor 406 communicates with wireless network 120 through wireless network communication module 402 in accordance with IS-707 protocols. Wireless network communication module 402 could alternatively utilize IS-2000, W-CDMA, or a time-division-multiple-access (TDMA) interface such as EDGE or GSM. Alternatively, wireless network communication module 402 could provide wireless communication through a satellite-based wireless system such as Globalstar.

In the exemplary embodiment, control processor 406 receives initial data packets from one of its physical interfaces, such as serial port 412. Control processor 406 then establishes a wireless communication channel with wireless network 120 through wireless network communication module 402. While establishing this initial wireless communication channel, wireless network 120 assigns the packet data session a service reference identifier sometimes called an SR_ID. Subscriber station 106 then associates that service reference identifier with the physical and logical connection through which the packet data session was initiated. Once the wireless connection between subscriber station 106 and wireless network 120 becomes dormant, the service reference identifier is used to associate subsequent packet data calls with the packet data session.

In the exemplary embodiment, control processor 406 monitors the status of each local interface to determine accessibility or inaccessibility of remote devices such as laptop computer 102. If the remote network node associated with an interface and service reference identifier is inaccessible when an associated land-to-mobile packet data call is initiated by wireless network 120, control processor 406 forms a release message containing a termination notification for the packet data session. Control processor 406 identifies the packet data session being terminated using the service reference identifier and then sends the release message. As discussed above, the release message may be release request message 218, a Resource Release Request message, or any other message that identifies a packet data session to be terminated.

Control processor 406 may be a general-purpose microprocessor, digital signal processor (DSP), programmable logic device, application specific integrated circuit (ASIC), or any other device capable of performing the functions described herein. Handset user input interface 416 and handset display 418 may include a keypad, a liquid crystal display (LCD) pen input interface such as those commonly used on handheld personal digital assistant devices (PDA's), or any other input interface appropriate for wireless packet data user applications.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for processing a land-to-mobile packet data call origination comprising the steps of:
   receiving a page from a wireless network to originate a packet data call with an inaccessible remote network node having a dormant network connection with a packet data network; and
   sending a release message to the wireless network, said release message comprising a packet data session termination notification.

2. The method of claim 1 wherein said packet data session termination notification identifies one or more packet data sessions to be terminated by the wireless network.

3. The method of claim 1 further comprising the steps of:
   performing service negotiation with the wireless network; and
   extracting packet data session identification information associated with the land-to-mobile packet data call origination from information received during said service negotiation, wherein the packet data session identified corresponds to the inaccessible remote network node.

4. The method of claim 3 wherein said release message is a release request message having an order qualification code (ORDQ) field identifying the packet data session corresponding to the inaccessible remote network node.

5. The method of claim 4 wherein said ORDQ field comprises a bit map identifying the packet data session corresponding to the inaccessible remote network node.

6. The method of claim 3 wherein said release message is a Resource Release Request message identifying the packet data session corresponding to the inaccessible remote network node.

7. The method of claim 6 wherein said release message comprises a service reference identifier based on the packet data session corresponding to the inaccessible remote network node.

8. The method of claim 3 further comprising the step of storing a session identifier in the packet data session termination notification identifying the packet data session corresponding to the inaccessible remote network node.

9. The method of claim 8 wherein said session identifier is a service reference identifier.

10. The method of claim 3 further comprising the step of sending a connect order message to the wireless network.

11. The method of claim 1 further comprising the steps of:
    performing service negotiation with the wireless network; and
    using information received during said service negotiation to identify the land-to-mobile call origination as a packet data call origination.

12. The method of claim 11 wherein said release message is a release request message having an order qualification code (ORDQ) field specifying one or more packet data sessions to be terminated.

13. The method of claim 12 wherein said ORDQ field comprises a bit map that identifies said one or more packet data sessions to be terminated.

14. The method of claim 11 wherein said release message is a release request message having an order qualification code (ORDQ) field specifying that all packet data sessions be terminated.

15. The method of claim 11 wherein said release message is a Resource Release Request message identifying one or more packet data sessions to be terminated.

16. The method of claim 15 wherein said release message comprises a service reference identifier corresponding to each of said one or more packet data sessions to be terminated.

17. A method for processing a land-to-mobile packet data call origination comprising the steps of:
    receiving a page from a wireless network to originate a packet data call;
    performing service negotiation with the wireless network;
    extracting packet data session identification information associated with the land-to-mobile packet data call origination from information received during said service negotiation, wherein the packet data session identified corresponds to an inaccessible remote network node;
    receiving and decoding an alert with information message directing the activation of a ringer;
    sending a connect order message to the wireless network without activating the ringer; and
    sending a release message to the wireless network, said release message comprising a packet data session termination notification.

18. Wireless subscriber station apparatus comprising;
    a control processor configured to receive a page from a wireless network to originate a packet data call with an inaccessible remote network node having a dormant network connection with a packet data network, and generating a release message comprising a packet data session termination notification; and
    a wireless network communication module configured to transmit the release message to the wireless network.

19. The apparatus of claim 18 wherein said control processor is further configured to format the fields of the packet data session termination notification to identify one or more packet data sessions to be terminated by the wireless network.

20. The apparatus of claim 18 wherein said control processor is further configured to extract packet data session identification information associated with the land-to-mobile packet data call origination from information received during service negotiation, wherein the packet data session identified corresponds to the inaccessible remote network node.

21. The apparatus of claim 18 wherein said wireless network communication module is a CDMA wireless network communication module.

22. The apparatus of claim 21 wherein said wireless network communication module is a W-CDMA wireless network communication module.

23. The apparatus of claim 21 wherein said wireless network communication module is an IS-2000 wireless network communication module.

24. The apparatus of claim 21 wherein said wireless network communication module is an IS-95 wireless network communication module.

25. The apparatus of claim 18 wherein said wireless network communication module is a TDMA wireless network communication module.

26. A method of packet data call origination comprising:

receiving a page from a wireless network to originate a packet data call for a remote network node having a dormant connection through the wireless network to a packet data network;

evaluating the accessibility of the remote network node; and sending a release message to the wireless network in response to the page if the remote network node is inaccessible.

27. The method of claim 26 wherein the release message relates to the termination of a packet data session for the remote network node.

28. The method of claim 26 further comprising:

performing service negotiation with the wireless network in response to the page; and extracting information from the service negotiation identifying a packet data session for the remote network node.

29. The method of claim 28 wherein the release message comprises a release request message having an order qualification code (ORDQ) field identifying the packet data session.

30. The method of claim 29 wherein the ORDQ field comprises a bit map identifying the packet data session.

31. The method of claim 28 wherein the release message comprises a Resource Release Request message identifying the packet data session.

32. The method of claim 31 wherein the release message further comprises a service reference identifier based on the packet data session.

33. The method of claim 28 further comprising sending a connect order message to the wireless network.

34. The method of claim 28 further comprising:

receiving an alert from the wireless network directing the activation of a ringer; and sending a connect order message to the wireless network without activating the ringer.

35. A subscriber station, comprising:

a control processor configured to receive a page from a wireless network to originate a packet data call for a remote network node having a dormant network connection to a packet data network, evaluate the accessibility of the remote network node, and generate a release message in response to the page if the remote network node is inaccessible; and a wireless network communication module configured to transmit the release message to the wireless network.

36. The subscriber station method of claim 35 wherein the release message relates to the termination of a packet data session for the remote network node.

37. The subscriber station of claim 35 wherein the control processor is further configured to perform service negotiation with the wireless network in response to the page, and extract information from the service negotiation identifying a packet data session for the remote network node.

38. The subscriber station of claim 37 wherein the release message comprises a release request message having an order qualification code (ORDQ) field identifying the packet data session.

39. The subscriber station of claim 38 wherein the ORDQ field comprises a bit map identifying the packet data session.

40. The subscriber station of claim 32 wherein the release message comprises a Resource Release Request message identifying the packet data session.

41. The subscriber station of claim 40 wherein the release message further comprises a service reference identifier based on the packet data session.

42. The subscriber station of claim 37 wherein the control processor is further configured to generate a connect order message, and the wireless network communication module is further configured to transmit the connect order message to the wireless network.

43. The subscriber station of claim 37 wherein the control processor is further configured to receiving an alert from the wireless network directing the activation of a ringer, and generate a connect order message without activating the ringer, and wherein the wireless network communication module is further configured to transmit the connect order message to the wireless network.

44. A subscriber station, comprising:

means for receiving a page from a wireless network to originate a packet data call for a remote network node having a dormant connection through the wireless network to a packet data network;

means for evaluating the accessibility of the remote network node; and means for sending a release message to the wireless network in response to the page if the remote network node is inaccessible.

* * * * *